Figure 1:
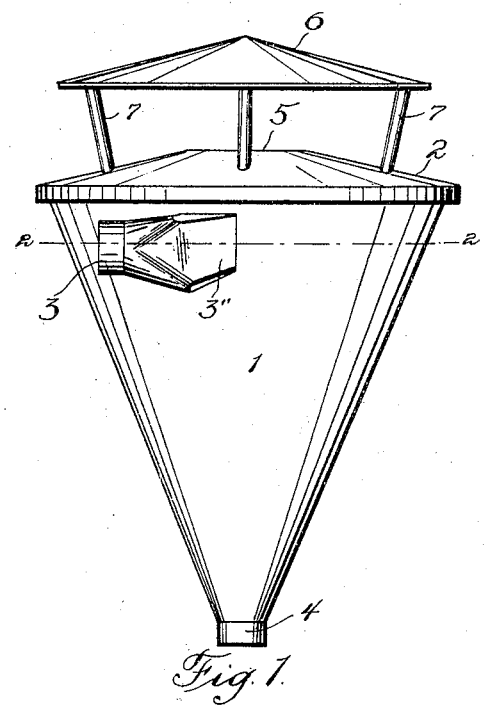

No. 775,664. PATENTED NOV. 22, 1904.
C. McVEETY.
DUST SEPARATOR AND COLLECTOR.
APPLICATION FILED DEC. 4, 1903.
NO MODEL. 2 SHEETS—SHEET 1.

Witnesses
Chas. M. Harrell,
M. B. Schley

Inventor
Charles McVeety
By Walter W. Calmore
his Attorney

No. 775,664. PATENTED NOV. 22, 1904.
C. McVEETY.
DUST SEPARATOR AND COLLECTOR.
APPLICATION FILED DEC. 4, 1903.
NO MODEL. 2 SHEETS—SHEET 2.

Witnesses

Inventor
Charles McVeety
By Walter W. Cahmore
his Attorney

No. 775,664. Patented November 22, 1904.

UNITED STATES PATENT OFFICE.

CHARLES McVEETY, OF CHELTENHAM, PENNSYLVANIA, ASSIGNOR OF ONE-HALF TO JOHN F. FORD, OF PHILADELPHIA, PENNSYLVANIA.

DUST SEPARATOR AND COLLECTOR.

SPECIFICATION forming part of Letters Patent No. 775,664, dated November 22, 1904.

Application filed December 4, 1903. Serial No. 183,769. (No model.)

*To all whom it may concern:*

Be it known that I, CHARLES McVEETY, a citizen of the United States, residing at Cheltenham, in the county of Montgomery and State of Pennsylvania, have invented certain new and useful Improvements in Dust Separators and Collectors, of which the following is a specification.

My invention relates to an improvement in dust separators or collectors.

The object of the invention is to provide means whereby the dust-laden air-currents upon entering the separator are caused to travel around the same, thus being relieved of the heavier particles of dust, which fall to the bottom and escape, while the currents upon nearing the center of the separator are deflected and caused to reverse their direction, through which action they are freed of their light particles, the air-currents finally escaping through the top of the separator thoroughly purified. By my method and means the separation is gradual and without a great amount of pressure, the particles being removed according to their size, the larger being first dropped, the medium next, and the light last. Thus it is evident that the particles will be treated independently yet continuously and that the separation will be complete, and, further, that the air will emerge from the separator thoroughly purified.

Another feature resides in the fact that the pressure near the bottom of the separator is reduced and the particles are allowed a gradual fall. Still another novelty lies in a cap placed over the air-escape, whereby back pressure is prevented and the interior of the separator protected.

Finally, the object of the invention is to provide a device of the character described that will be strong, durable, and efficient and one that will be comparatively inexpensive and simple to construct and also one in which the working parts will not be liable to get out of order.

With the above and other objects in view the invention consists in the novel details of construction and operation herein set forth, a preferable embodiment of which is described in the specification and illustrated in the drawings, wherein—

Figure 2:
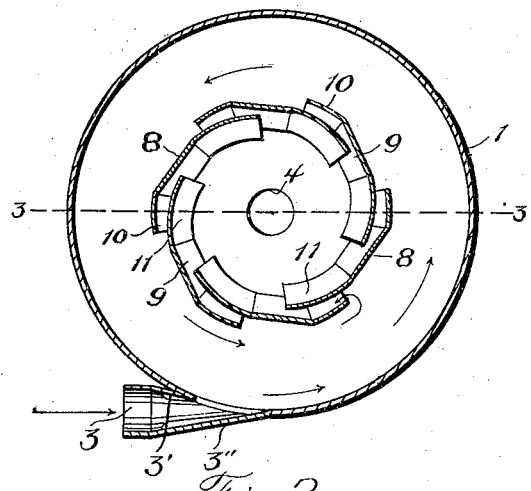
Figure 3:
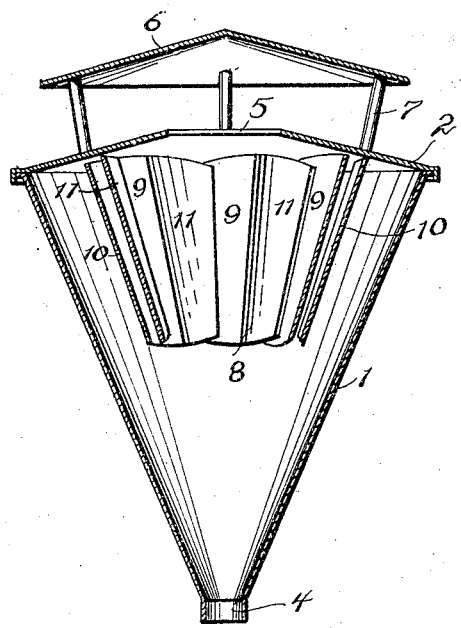
Figure 4:
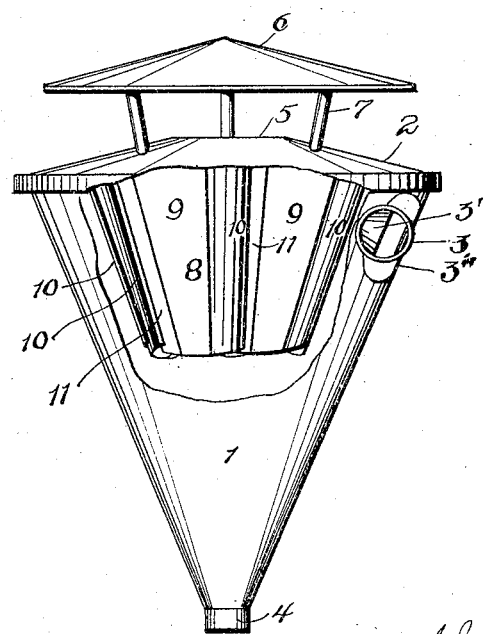

Figure 1 is a view in elevation, showing the side of the spout. Fig. 2 is a transverse sectional view taken on the line 2 2 of Fig. 1. Fig. 3 is a vertical sectional view taken on the line 3 3 of Fig. 2, and Fig. 4 is a view in elevation broken away to show the deflectors.

In the drawings the numeral 1 designates the casing, which is shaped in the form of an inverted truncated cone and provided with a conical top 2, suitably removably secured to the casing, whereby the interior of the latter is readily accessible for the purposes of inspection and cleansing. Communicating with the upper portion of the casing is a spout 3, suitably connected by a pipe or the like to a fan such as is ordinarily employed in the art to which this invention appertains. The spout is contracted laterally toward its outlet end and formed with a converging wall 3' and a straight wall 3'', arranged tangentially to the wall of the casing, whereby the air-currents are ejected in a narrow vertical stream and caused to closely hug the wall of the casing upon first entering the same. The casing 1 is provided with a ring 4 at its lower end, to which is attached means for removing the particles as they fall or settle from the air-currents. An air-escape opening 5 is formed in the center of the top 2, over which a conical cap 6, of greater diameter than the opening 5, is supported by legs 7, secured upon the top 2.

Extending downwardly from the under side of the top 2 is a deflector-cone formed in its entirety of a series of overlapping converging deflectors 8. These deflectors are in the form of elongated plates and are formed with an intermediate flat portion 9 and curved ends 10 and 11. These deflectors are secured only at their upper ends. The end 10 is curved in an arc parallel to the wall of the casing 1, while the end 11 is curved inwardly toward the center of the casing. Thus it will be evident that the air-currents (indicated by the arrows) upon entering the casing will travel around the same in a helical path, thereby gradually drawing toward the deflectors, and that, seeking an outlet, they will pass between the overlapping portions of the said deflectors. This action causes the currents to reverse their direction of travel. The air-currents passing between the overlapping portions first impinge the inner surfaces of the ends 10 and the outer surfaces of the ends 11 and are then guided along the flat portions 9 and finally directed toward the center of the casing, from which they escape through the opening 5 and out from under the cap 6. The space in the center of the casing inclosed by the deflectors 8 constitutes a settling-chamber from which the lightest of the particles fall.

The cap 6, owing to its conical shape, will shed elements coming in contact therewith and by completely covering the opening 5 will prevent any back pressure from escaping currents or currents directed toward the top of the casing.

The operation from the foregoing is quite clear and is as follows: Dust-laden air-currents entering under pressure through the spout 3 will pass out the end thereof in a narrow stream caused by the straight and converging walls 3' and 3" and whirl around the casing in a helical stream. Owing to their helical movement in passing around the casing, the currents are relieved of the heavier particles of dust, which fall against the walls thereof and are directed toward the bottom, at which point the pressure is reduced and the particles are allowed to pass out through the ring 4. The currents seeking an outlet are drawn toward the deflectors 8. It is to be understood that during the helical movement of the currents the dust particles undergo a gradual reduction and when the said currents impinge against the deflectors 8 only the light particles remain unseparated. Upon impinging the deflectors the currents will pass between the outer surfaces of the ends 11 and the inner surfaces of the ends 10 of the overlapping portions, thereby being reversed in their direction or line of travel, and thence directed or deflected toward the center of the casing by the flat portions 9 and the ends 11. This reverse action causes the light particles to become detached from the currents and settle or fall to the bottom of the casing and pass out, the air-currents escaping through the opening 5 and out from under the cap 6 in a purified state.

It will be evident that the specific gravity of the dust particles being greater than that of the air-currents the particles are carried by the momentum of the currents, which is gradually reduced toward the reversing-point, thus allowing the particles to fall or settle gradually as their weight overcomes the momentum of the currents.

The light particles having a specific gravity only slightly greater than that of the air-currents, it is necessary to check the momentum of the currents. This is accomplished by the reverse action, which practically momentarily stops the currents completely, thereby permitting the said particles of dust to settle or drop.

From the above it will be seen that a continuous separation is maintained and that the particles are removed expeditiously and without any great checking of the flow of the currents.

I do not wish to limit myself to the exact details of construction and operation herein set forth, as I may make various changes in the same without departing from the spirit of my invention.

Having thus fully described my invention, what I claim as new, and desire to secure by Letters Patent, is—

In a dust-separator, an inverted conical casing having a dust-outlet at its bottom and a conical top having an air-escape opening, a contracted spout arranged tangentially to the casing, an inverted, truncated, conical deflector projecting downwardly from the top of the casing and arranged concentrically to the air-escape opening, comprising overlapping, converging, curved wings, and a cap supported upon the top over the air-escape opening, substantially as described.

In testimony whereof I affix my signature in presence of two witnesses.

CHARLES McVEETY.

Witnesses:
WINFIELD S. SHEARD,
A. AUSTIN BUZBY.